Feb. 17, 1970     H. J. JESPERSEN     3,495,623
DOUBLE-SEAT VALVE AND METHOD OF ASSEMBLING THE SAME
Filed Feb. 28, 1967
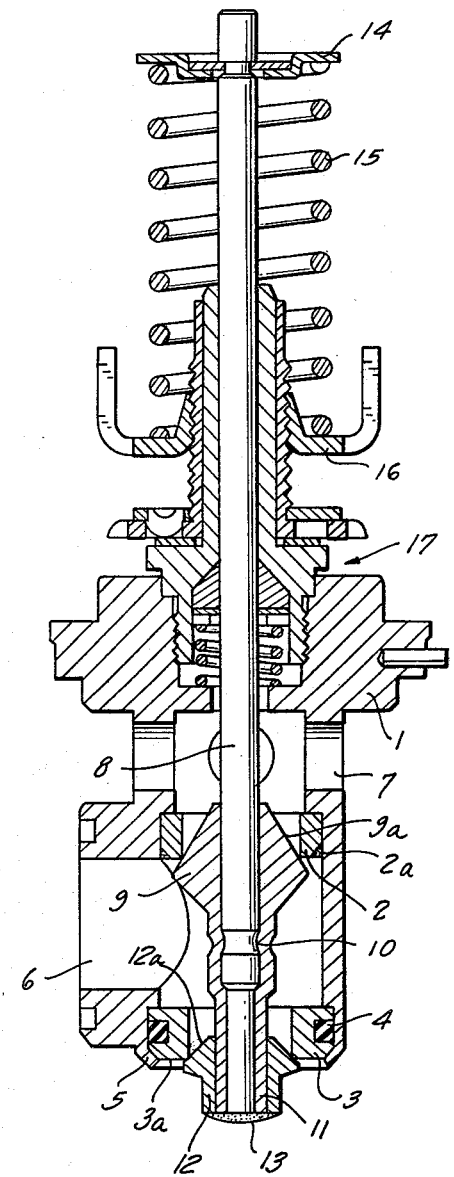
INVENTOR
HANS JORGEN JESPERSEN
BY
ATTORNEY

United States Patent Office 3,495,623
Patented Feb. 17, 1970

3,495,623
DOUBLE-SEAT VALVE AND METHOD OF
ASSEMBLING THE SAME
Hans Jorgen Jespersen, Ulkebol, Denmark, assignor to
Danfoss A/S, Nordborg, Denmark
Filed Feb. 28, 1967, Ser. No. 619,254
Claims priority, application Germany, Mar. 1, 1966,
D 49,465
Int. Cl. F16k 1/44, 27/02
U.S. Cl. 137—625.36       14 Claims

ABSTRACT OF THE DISCLOSURE

Method of connecting a second valve member to the valve stem in the body of a double-seat valve wherein the first valve member is located between an inner and an outer seat ring and is rigid with the stem. The first valve member is biased against that side of the inner seat ring which faces the outer seat ring with a pressure which produces a desired sealing action. The second valve member is thereupon biased against that side of the outer seat ring which faces away from the inner seat ring, and the second valve member is then bonded to the stem and/or to the first valve member while it bears against the outer seat ring with the same pressure which is maintained between the first valve member and the inner seat ring. In this way, the distance between the sealing surfaces of the two valve members is identical with the distance between such sides of the two seat rings which are engaged by the respective sealing surfaces when the valve is to prevent flow of a fluid which enters through an inlet provided in the valve body between the two seat rings and tends to escape through openings defined by the seat rings.

BACKGROUND OF THE INVENTION

The present invention relates to a double-seat valve and to a method of assembling the body of a double-seat valve with the seat rings, valve members and other components. More particularly, the invention relates to a double-seat valve of the type wherein both valve members should bear against their respective seat rings with equal sealing pressure.

Double-seat valves are often utilized in refrigerating plants, for example, to control the flow of a fluid from a single inlet in two separate paths and toward a common outlet. The purpose of the valve members and seat rings is to relieve the pressure of fluid.

Serious problems arise in assembly of double-seat valves if the sealing pressure exerted by one of the valve members is to be identical with the sealing pressure which is exerted by the other valve member. In other words, it is often desirable to make the distance between the sealing surfaces of the valve members identical with the distance between such sides or surfaces of the seat rings which are engaged by the respective sealing surfaces when the valve is closed. Even small discrepancies might cause overstressing of one valve member while the other valve member permits leakage of fluid through the opening of the associated seat ring.

In accordance with the presently prevailing practice, one of the valve members is threadedly connected to the stem which latter is rigid with the other valve member. This enables the operator to adjust the axial distance between the valve members. However, such solutions are not entirely satisfactory because a threaded connection is not as reliable as a welded, soldered, brazed or other permanent connection.

Accordingly, it is an important object of the present invention to provide a method of assembling the valve members and the stem of a double-seat valve in such a way that, when the first valve member is moved into sealing engagement with its seat ring, the pressure between the second valve member and the other seat ring is invariably identical with the pressure exerted by the first valve member.

Another object of the invention is to provide a method of the just outlined character according to which the distance between the valve members can be determined and fixed under circumstances which are identical with the conditions prevailing when the valve is in actual use.

A further object of the invention is to provide a double-seat valve whose valve members are assembled with the stem in accordance with the above outlined method.

SUMMARY OF THE INVENTION

One feature of the present invention resides in the provision of a method of assembling a double-seat valve wherein the valve body has two axially spaced seat rings disposed in the valve body at the opposite sides of a first valve member which is rigidly connected to a valve stem extending through at least one of the seat rings. In accordance with a presently preferred embodiment of the invention the method includes the steps of introducing the stem into the valve body to place the first valve member at least close to one of the seat rings, thereupon installing the other seat ring in the valve body, subjecting the stem and/or the first valve member to the action of an axially oriented first force to bias the first valve member against the one seat ring with a predetermined pressure which is preferably adjustable, subjecting a second valve member to the action of a second force to bias the second valve member against the other seat ring with a second pressure which equals the aforementioned pressure, and rigidly (and preferably permanently) connecting the second valve member to the stem and/or to the first valve member while the second valve member is so biased against the other seat ring. This insures that the distance between the sealing surfaces of the valve members is the same as the distance between such sides of the seat rings which are engaged by the respective sealing surfaces when the stem is moved to a position in which the valve is closed.

The second valve member is biased against that side of the other seat ring which faces away from the one seat ring and the first valve member is biased against that side of the one seat ring which faces the other seat ring. Thus, the second valve member is not located between the seat rings so that the valve stem can be displaced under or against the bias of an adjustable spring to move the two valve members against or away from the respective seat rings.

The novel features which are considered as characteristic of the invention are set forth in particular in the appended claims. The improved valve itself, however, both as to its construction and the method of assembling the same, together with additional features and advantages thereof, will be best understood upon perusal of the following detailed description of certain specific embodiments with reference to the accompanying drawing.

BRIEF DESCRIPTION OF THE DRAWING

The single figure is an axial section through a double-seat valve which embodies the present invention.

DESCRIPTION OF THE PREFERRED EMBODIMENTS

The drawing shows a double-seat valve which comprises a valve body 1 accommodating a pair of axially spaced seat rings including an inner ring 2 and an outer ring 3. The inner ring 2 is surrounded by a relatively thick intermediate portion of the valve body 1. The outer ring 3 has a circumferential groove receiving an annular gasket 4 and its maximum diameter exceeds the maximum diameter of the inner ring 2. It will be seen that the outer ring 3 is surrounded by a relatively thin wall portion of the valve body 1 and that the lower part of such annular portion is upset by flanging, as at 5, to overlie the outer ring 3 whereby the latter is safely retained in the valve body and the gasket 4 prevents leakage of fluid which is admitted through an inlet 6 provided in the valve body 1 between the seat rings 2 and 3.

The bores 7 of the valve body 1 above the inner seat ring 2 and the space below the lower or outer side 3a of the outer seat ring 3 communicate with a common outlet which is not shown in the drawing. The valve body 1 may be installed in a casing or housing (not shown) which is provided with connection flanges and wherein the inlet 6 is separated from the aforementioned common outlet.

The valve body 1 accommodates a first or upper valve member 9 having an annular sealing surface 9a which normally bears against the adjoining inner side 2a of the inner seat ring 2, namely, against that side which faces the outer seat ring 3. The valve member 9 has a tubular extension 11 which projects beyond the lower end of a reciprocable valve stem 8 and has an end face located below the outer side 3a of the outer seat ring 3. The stem 8 has a circumferential groove 10 which receives a radially inwardly deformed portion of the extension 11 so that the valve member 9 is rigid with the stem 8, i.e., it must at least share all axial movements of the stem.

A second valve member 12 whose annular sealing surface 12a normally bears against the outer side 3a of the outer seat ring 3 is rigidly connected with the stem 8 through the intermediary of the valve member 9. In the illustrated embodiment, the valve member 12 is bonded to the lower end face of the extension 11 by a soldered joint 13.

The stem 8 extends through a stuffing box 17 in the upper part of the valve body 1 and its upper end carries a detachable retainer 14 for the uppermost convolution of a prestressed resilient element here shown as a helical spring 15 which operates between the stem 8 and valve body 1 to bias the sealing surfaces 9a, 12a of the valve members 9, 12 against the sides 2a, 3a of the respective seat rings 2, 3. The bias of the spring 15 can be regulated by an adjusting nut 16 which meshes with the gland of the stuffing box 17.

The valve is assembled as follows:

In the first step, the inner seat ring 2 is brazed into the valve body 1. In the next step, the stem 8 (with the valve member 9 rigidly secured thereto) is introduced from below so that the valve member 9 enters the valve body. The retainer 14 is then affixed to the upper end of the stem 8 and the bias of the spring 15 is selected by turning the nut 16 so that the stem 8 is subjected to the action of an upwardly directed axial force and the sealing surface 9a of the valve member 9 bears against the inner side 2a of the seat ring 2 with a predetermined sealing pressure.

The outer seat ring 3 is then installed in the lower end portion of the valve body 1 and is fixed in position by flanging or upsetting, as at 5. In the next-following step, the valve member 12 is slipped onto the extension 11 of the valve member 9 and is subjected to the action of an upwardly directed axial force so that its sealing surface 12a bears against the outer side 3a of the seat ring 3 with the same pressure which exists between the valve member 9 and seat ring 2. The device which causes the valve member 12 to bear against the seat ring 3 with such predetermined pressure is known and its construction forms no part of the present invention. In the final step, the valve member 12 is soldered to the extension 11 (as at 13). The axial distance between the sealing surfaces 9a, 12a is then identical with the distance between the inner side 2a of the seat ring 2 and the outer side 3a of the seat ring 3. This insures that the seal between the valve member 9 and ring 2 is just as satisfactory as the seal between the valve member 12 and ring 3. Furthermore, the sealing action remains unchanged during the entire useful life of the valve.

Of course, the improved valve is susceptible of many modifications without departing from the spirit of my invention. For example, the extension 11 may be made shorter and the stem 8 can extend into and beyond the outer seat ring 3 so that it can be welded, soldered, brazed or otherwise rigidly connected to the valve member 12. Furthermore, the soldered joint 13 need not be provided on the end face of the extension 11, i.e., it can be provided at another point to join the valve members 9, 12 into a rigid unit. It is further clear that the stem 8 can extend downwardly beyond the valve member 12 and that the spring 15 can be replaced by a package of dished springs or by other suitable biasing means serving to urge the valve members 9, 12 against or away from the respective seat rings. Also, and if the stem 8 extends downwardly beyond the valve member 12, the spring 15 or an analogous biasing device can operate between the valve body 1 and the lower end portion of the stem. All such modifications will be readily understood upon perusal of the preceding disclosure and without additional illustrations.

A very important advantage of my assembling method is that a major part of the valve can be assembled prior to connecting the valve member 12 to the stem 8 and that the valve member 12 is assembled with the valve member 9 and stem 8 under circumstances which correspond to those when the valve is in actual use and its valve members seal the inlet 6 from the aforementioned common outlet. Also, a single resilient element 15 suffices to maintain both valve members in sealing position Since the maximum diameter of the outer seat ring 3 exceeds the maximum diameter of the inner seat ring 2, the latter can be readily introduced into the valve body 1 from below. Moreover, and since the two valve members can be directly connected to each other, the connection between such valve members need not include any separately machined intermediate parts which would contribute to higher initial cost and would be likely to increase the tolerances, particularly the uniformity of sealing action produced by the valve members.

If the opening in the outer seat ring 3 is large enough to permit passage of the valve member 9, the ring 3 can be installed in the body 1 prior to insertion of the stem 8 and valve member 9. In such instances, the ring 3 can be welded or otherwise integrally joined to the body 1.

In accordance with my novel assembling method, the sealing action of the valve members 9, 12 is not dependent on the distance between the seat rings 2, 3 because the valve member 12 is attached to the stem 8 and/or valve member 9 subsequent to mounting of seat rings in the valve body 1. Thus, and if the dimensions of a series of mass-produced seat rings 2 or 3 are not the same, each successively assembled double-seat valve will provide a highly satisfactory sealing action because the distance between the sealing surfaces 9a, 12a is always determined subsequent to mounting of seat rings 2, 3 in the valve body 1 and corresponds to the distance between the sides 2a, 3a of the seat rings.

Without further analysis, the foregoing will so fully reveal the gist of the present invention that others can, by applying current knowledge, readily adapt it for various applications without omitting features which fairly constitute essential characteristics of the generic and specific aspects of my contributions to the art and, therefore, such adaptations should and are intended to be comprehended within the meaning and range of equivalence of the claims.

What is claimed as new and desired to be protected by Letters Patent is set forth in the appended claims:

1. A method of assembling a double-seat valve wherein the valve body has two axially spaced seat rings disposed in the valve body at the opposite sides of a first valve member provided on a valve stem, comprising subjecting the stem to the action of an axially oriented first force to bias the first valve member against one of the seat rings with a predetermined pressure; subjecting a second valve member to the action of a second axial force to bias the second valve member against the other seat ring with a second pressure which equals said predetermined pressure; and only subsequently thereto connecting the second valve member to the stem while the second valve member is so biased against the other seat ring.

2. A method as defined in claim 1, wherein the second valve member is biased against that side of the other seat ring which faces away from the one seat ring.

3. A method as defined in claim 2, wherein said connecting step comprises permanently bonding the second valve member to the stem.

4. A method as defined in claim 2, wherein the step of subjecting the stem to the action of said first force comprises deforming a spring which operates between the valve body and the stem.

5. A method as defined in claim 2, further comprising the steps of introducing the stem into the valve body to place the first valve member at least close to the one seat ring, and thereupon connecting the other seat ring to the valve body prior to biasing the second valve member against said side of the other seat ring.

6. A method as defined in claim 2, wherein the step of connecting the other seat ring to the valve body comprises upsetting a portion of the valve body to overlie the other seat ring.

7. A method as defined in claim 2, wherein the step of connecting the second valve member to the stem comprises connecting the second valve member to the first valve member.

8. A double-seat valve comprising a valve body and having two co-axially arranged valve seats constituted by an inner ring and an outer ring, the maximum diameter of said outer ring exceeding the maximum diameter of said inner ring and said valve body comprising a relatively thick wall portion surrounding said inner ring and a relatively thin wall portion surrounding said outer ring; bearing means mounted coaxially with said valve seats and said valve body outwardly from and closer to said inner ring than to said outer ring; a reciprocable valve stem solely supported and guided for movement in axial direction by said bearing means, said valve stem extending through both of said rings and having a portion projecting beyond said outer ring; a first valve member mounted on said valve stem adjacent to and cooperating with said inner ring; and a second valve member mounted on said projecting portion of said valve stem adjacent to and cooperating with said outer ring, said valve members respectively engaging said rings on the sides thereof facing away from said bearing means.

9. A valve as defined in claim 8, wherein said valve body has a fluid-admitting inlet intermediate said rings, the fluid escaping through said rings in response to axial movement of said stem in a direction to move said valve members away from the respective rings.

10. A double-seat valve comprising a valve body having two spaced co-axially arranged valve seats; bearing means mounted co-axially with said valve seats on said valve body outwardly from one of said valve seats; a reciprocable valve stem solely supported and guided for movement in axial direction by said bearing means located outwardly from said one of said valve seats, said valve stem extending through both of said valve seats and having a portion extending beyond the other of the valve seats; a first valve member mounted on said valve stem adjacent to and cooperating with said one of the valve seats; a second valve member mounted on said projecting portion of said valve stem adjacent to and cooperating with said other of said valve seats; and means for moving said stem in said axial direction and comprising resilient means operating between said valve body and said stem to urge the valve members against the respective valve seats.

11. A valve as defined in claim 10, further comprising adjusting means for regulating the bias of said resilient means.

12. A double-seat valve comprising a valve body having two spaced co-axial arranged valve seats; bearing means mounted co-axially with said valve seats on said valve body outwardly from one of said valve seats; a reciprocable valve stem solely supported and guided for movement in axial direction by said bearing means located outwardly from said one of said valve seats, said valve stem extending through both of said valve seats and having a portion projecting beyond the other of said valve seats, said portion having an end face located outside of said valve body; a first valve member mounted on said valve stem adjacent to and cooperating with said one of the valve seats; a second valve member mounted on said projecting portion of said valve stem adjacent to and cooperating with said other of said valve seats; and means for bonding said second valve member to said end face for fixedly connecting said second valve member to said stem.

13. A valve as defined in claim 12, wherein said projecting portion of said stem comprises a tubular extension integral with said first valve member and secured to the remainder of said stem.

14. A valve as defined in claim 12, wherein said two spaced valve seats are constituted by an inner ring adjacent said bearing means and an outer ring spaced further from said bearing means than said inner ring, said rings being respectively engaged by said valve members on the sides thereof facing away from said bearing means.

References Cited

UNITED STATES PATENTS

| 397,672 | 2/1889 | Tonge | 137—625.36 X |
|---|---|---|---|
| 1,927,727 | 9/1933 | Whitehurst | 137—625.36 |
| 1,275,831 | 8/1918 | Barrett | 137—625.36 |
| 1,783,884 | 12/1930 | Lee | 251—359 |
| 3,012,583 | 12/1961 | Gorgens et al. | 137—625.34 |

ROBERT W. MICHELL, Primary Examiner

U.S. Cl. X.R.

29—157.1; 137—625.5